(12) United States Patent
Morenko

(10) Patent No.: US 7,743,612 B2
(45) Date of Patent: Jun. 29, 2010

(54) INTERNAL FUEL MANIFOLD AND FUEL INLET CONNECTION

(75) Inventor: Oleg Morenko, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 869 days.

(21) Appl. No.: 11/534,243

(22) Filed: Sep. 22, 2006

(65) Prior Publication Data

US 2008/0072600 A1 Mar. 27, 2008

(51) Int. Cl.
*F02C 1/00* (2006.01)
*F02G 3/00* (2006.01)
(52) U.S. Cl. .......................... 60/739; 60/734
(58) Field of Classification Search .......... 60/734, 60/739, 740, 746, 747, 796, 799, 800, 804, 60/776
See application file for complete search history.

(56) References Cited

U.S. PATENT DOCUMENTS

| 1,081,950 | A |   | 12/1913 | Eller |  |
|---|---|---|---|---|---|
| 2,443,373 | A |   | 6/1948 | Borsoff |  |
| 2,676,461 | A | * | 4/1954 | Gove | 60/739 |
| 4,028,888 | A | * | 6/1977 | Pilarczyk | 60/798 |
| 4,305,255 | A | * | 12/1981 | Davies et al. | 60/741 |
| 4,332,626 | A |   | 6/1982 | Hood et al. |  |
| 4,377,420 | A |   | 3/1983 | Granatek et al. |  |
| 4,467,610 | A | * | 8/1984 | Pearson et al. | 60/739 |
| 4,472,133 | A |   | 9/1984 | Petersen et al. |  |
| 4,703,888 | A |   | 11/1987 | Kawamura et al. |  |
| 5,211,005 | A | * | 5/1993 | Hovnanian | 60/800 |
| 5,771,696 | A |   | 6/1998 | Hansel et al. |  |
| 5,797,266 | A |   | 8/1998 | Brocard et al. |  |
| 5,938,402 | A |   | 8/1999 | Bochud et al. |  |
| 5,944,483 | A |   | 8/1999 | Beck et al. |  |
| 6,109,038 | A | * | 8/2000 | Sharifi et al. | 60/737 |
| 6,354,085 | B1 | * | 3/2002 | Howell et al. | 60/740 |
| 6,487,860 | B2 | * | 12/2002 | Mayersky et al. | 60/739 |
| 6,503,334 | B2 |   | 1/2003 | Ruiz et al. |  |
| 6,564,555 | B2 | * | 5/2003 | Rice et al. | 60/746 |
| 6,672,071 | B2 | * | 1/2004 | Woltmann | 60/776 |
| 6,712,080 | B1 |   | 3/2004 | Handschuh et al. |  |
| 6,857,272 | B2 | * | 2/2005 | Summerfield et al. | 60/739 |
| 7,028,484 | B2 | * | 4/2006 | Prociw et al. | 60/772 |
| 7,530,231 | B2 | * | 5/2009 | Prociw et al. | 60/740 |
| 7,533,531 | B2 | * | 5/2009 | Prociw et al. | 60/739 |
| 7,540,157 | B2 | * | 6/2009 | Fish | 60/798 |
| 7,559,142 | B2 | * | 7/2009 | Patel et al. | 29/889.2 |
| 7,559,201 | B2 | * | 7/2009 | Prociw et al. | 60/739 |

* cited by examiner

*Primary Examiner*—William H Rodriguez
(74) *Attorney, Agent, or Firm*—Ogilvy Renault LLP

(57) ABSTRACT

An internal fuel manifold assembly for a gas turbine engine comprises a fuel manifold ring and a fuel inlet assembly fastened thereto. The fuel inlet assembly providing fluid flow communication with the fuel manifold ring and being joined to the fuel manifold ring at an inlet region thereon. The inlet region of the fuel manifold ring is reinforced relative to the remainder of the circumference of the fuel manifold ring.

18 Claims, 5 Drawing Sheets

INTERNAL FUEL MANIFOLD AND FUEL INLET CONNECTION

TECHNICAL FIELD

The technical field relates generally to internal fuel manifolds for gas turbine engines, and more specifically to a connection between an internal fuel manifold and a fuel inlet in a gas turbine engine.

BACKGROUND OF THE ART

Gas turbine engine internal fuel manifolds are located inside the engine case adjacent the engine combustor, and thus reside in an extremely hot environment. Typically, an internal fuel manifold is configured as a manifold ring having a fuel inlet tube attached thereto. The attachment between the fuel inlet and the annular manifold ring may be made by any number of ways, including welding, brazing and the like. However, the high temperature and high vibrations to which the fuel manifold is exposed within the gas turbine engine can cause weakening and/or cracking in the joint formed between the fuel manifold ring and its fuel inlet.

SUMMARY OF THE INVENTION

It is therefore an object of the present invention to provide an improved connection between an internal fuel manifold and a fuel inlet in a gas turbine engine.

There is therefore provided, in accordance with one aspect of the present invention, an internal fuel manifold assembly for a gas turbine engine comprising: a fuel manifold ring having at least one fuel conveying passage therein in fluid flow communication with a plurality of fuel injection nozzles adapted for spraying fuel into a combustor of the gas turbine engine, and an fuel inlet assembly having a fuel inlet tube providing fluid flow communication with said at least one fuel conveying passage within the fuel manifold ring, the fuel inlet assembly being joined to the fuel manifold ring at a inlet region thereon; said inlet region of the fuel manifold ring being reinforced relative to a remainder of a circumference of the fuel manifold ring.

There is also provided, in accordance with another aspect of the present invention, a mounting system for an internal fuel manifold of a gas turbine engine comprising a series of supports spaced apart about the fuel manifold, the series of supports including a fuel inlet assembly connected to the fuel manifold and providing fuel flow thereto, the fuel inlet assembly having a heat shield surrounding an internal fuel inlet tube defining a fuel flow passage therein, the fuel inlet assembly being joined to the fuel manifold at a inlet region thereon, said inlet region being reinforced relative to a remainder of the fuel manifold.

There is further provided, in accordance with another aspect of the present invention, a method of manufacturing an internal fuel manifold for a gas turbine engine comprising: forming an annular fuel manifold ring having at least one fuel conveying passage therein and having a nominal cross-sectional thickness in an axial direction about a majority of a circumference of the annular fuel manifold; and forming a reinforced inlet region of the annular fuel manifold, the reinforced inlet region being adapted to receive a fuel inlet therein for providing fuel flow to the at least one fuel conveying passage, the reinforced inlet region having a locally increased cross-sectional thickness relative to said nominal cross-sectional thickness.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
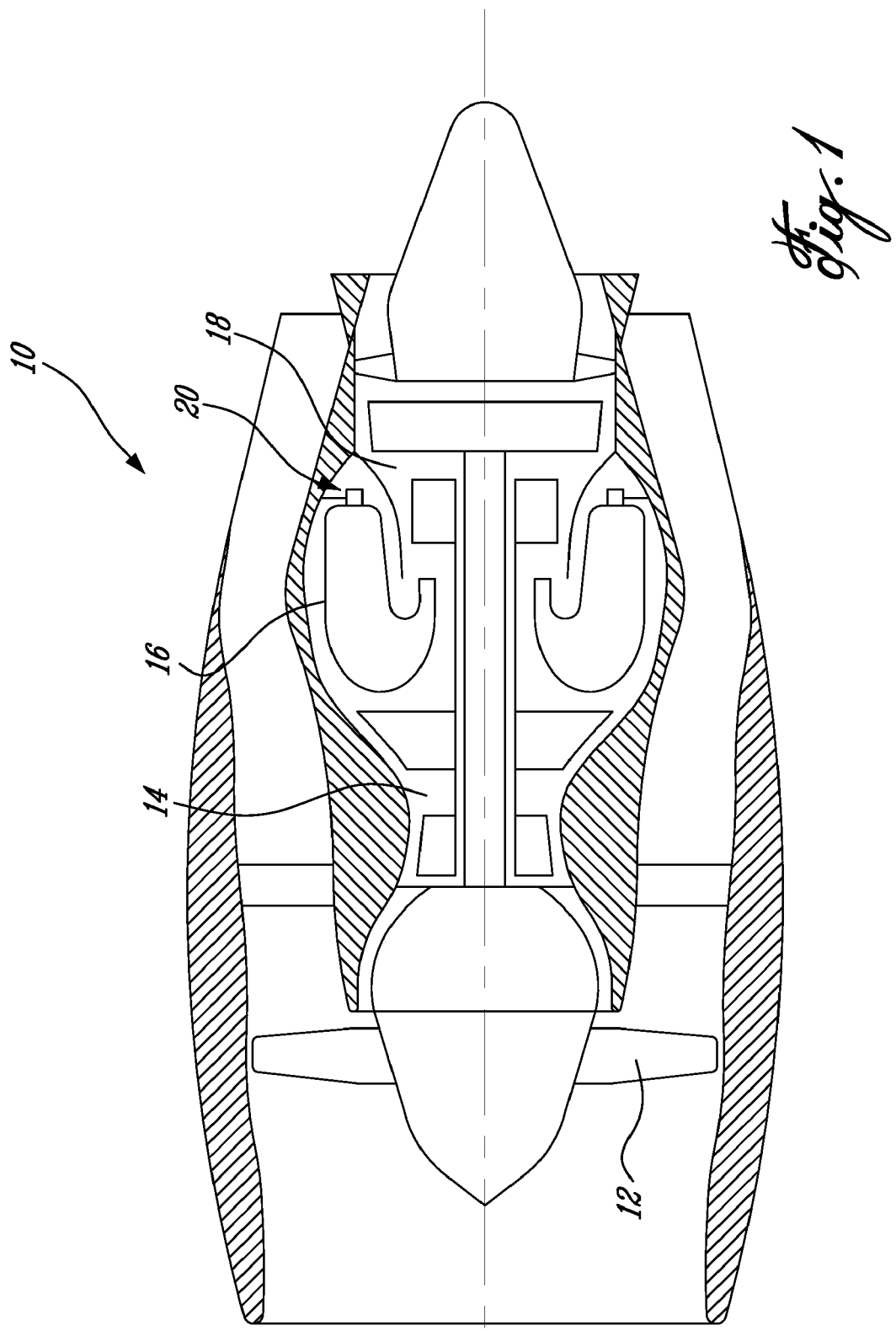
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

The term "axial" as used herein is intended, unless otherwise indicated, to mean in a directly or axis substantially parallel to the central longitudinal axis 11 of the engine 10.

Figure 2:
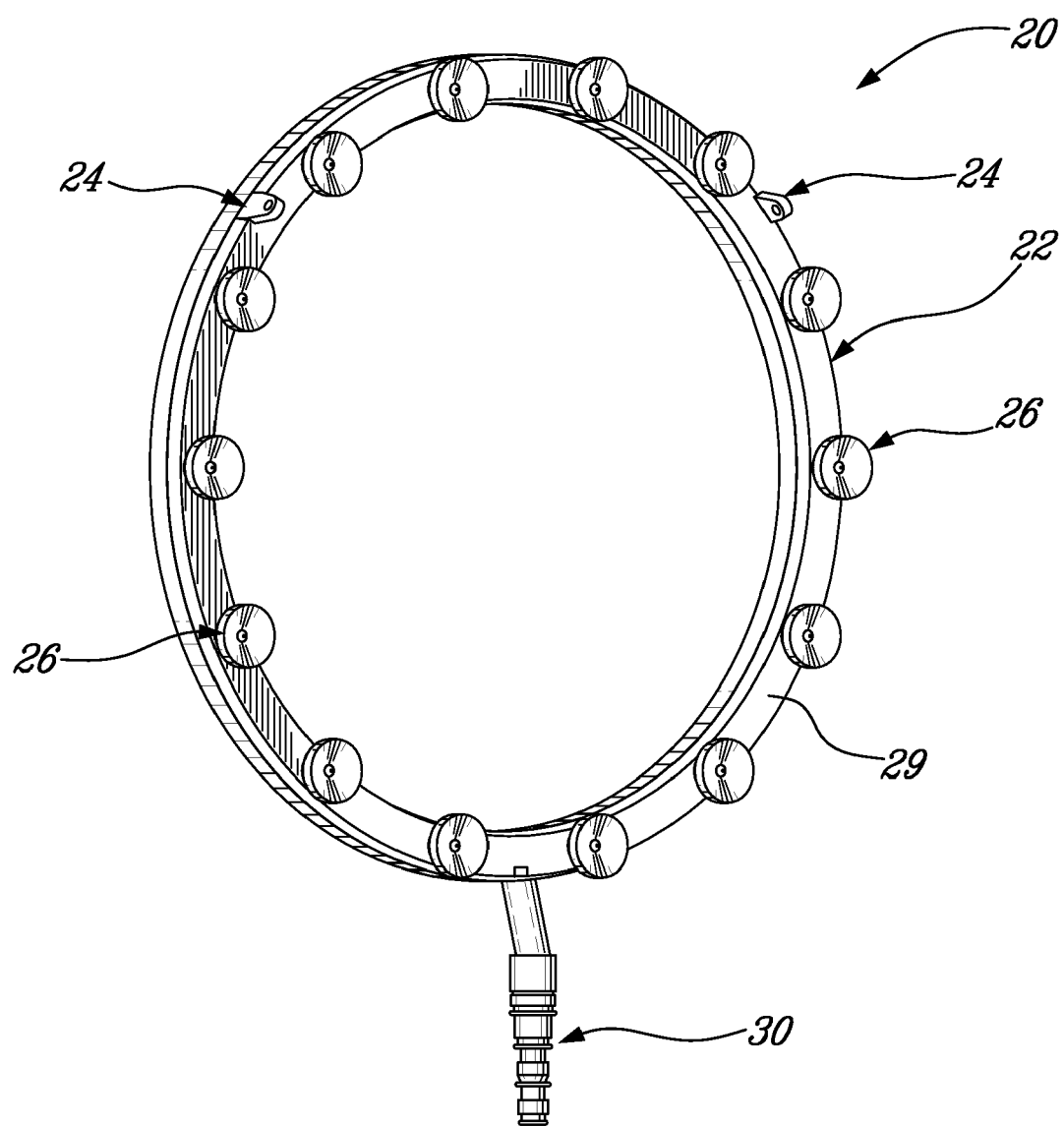
FIG. 2 is a perspective view of an internal fuel manifold incorporating a fuel inlet, for use in a gas turbine engine such as that depicted in FIG. 1.

Referring to FIG. 2, the fuel injection system 20 includes at least one fuel conveying member through which fuel flows. In the exemplary embodiment, the fuel injection system includes an annular fuel manifold 22 which is mounted adjacent to the combustor 16 in the gas turbine engine 10. The fuel manifold 22 is preferably mounted within the engine 10 by a mounting system which includes at least partially the fuel inlet assembly 30, as will be discussed further below. A pair of integral attachment lugs 24 which receive pins (not shown) may also comprise part of the mounting system for engaging the fuel manifold 22 of the fuel injection system within the engine. This provides a mounting system/mechanism which allows for secure attachment of the manifold within the supporting casing. A plurality of fuel injecting nozzle assemblies 26 are provided about the circumference of the fuel manifold 22. The fuel nozzle assemblies 26 atomize the fuel as it is injected into the combustor for ignition when mixed with the compressed air therein. Fuel entering the annular fuel manifold 22 via the fuel inlet assembly 30 is distributed within the manifold 22 such that fuel flow is provided to each of the fuel nozzles assemblies 26. A manifold heat shield 29 may cover at least a portion of the manifold, and preferably encloses the inner fuel manifold ring 28 about substantially its entire circumference.

Figure 3:
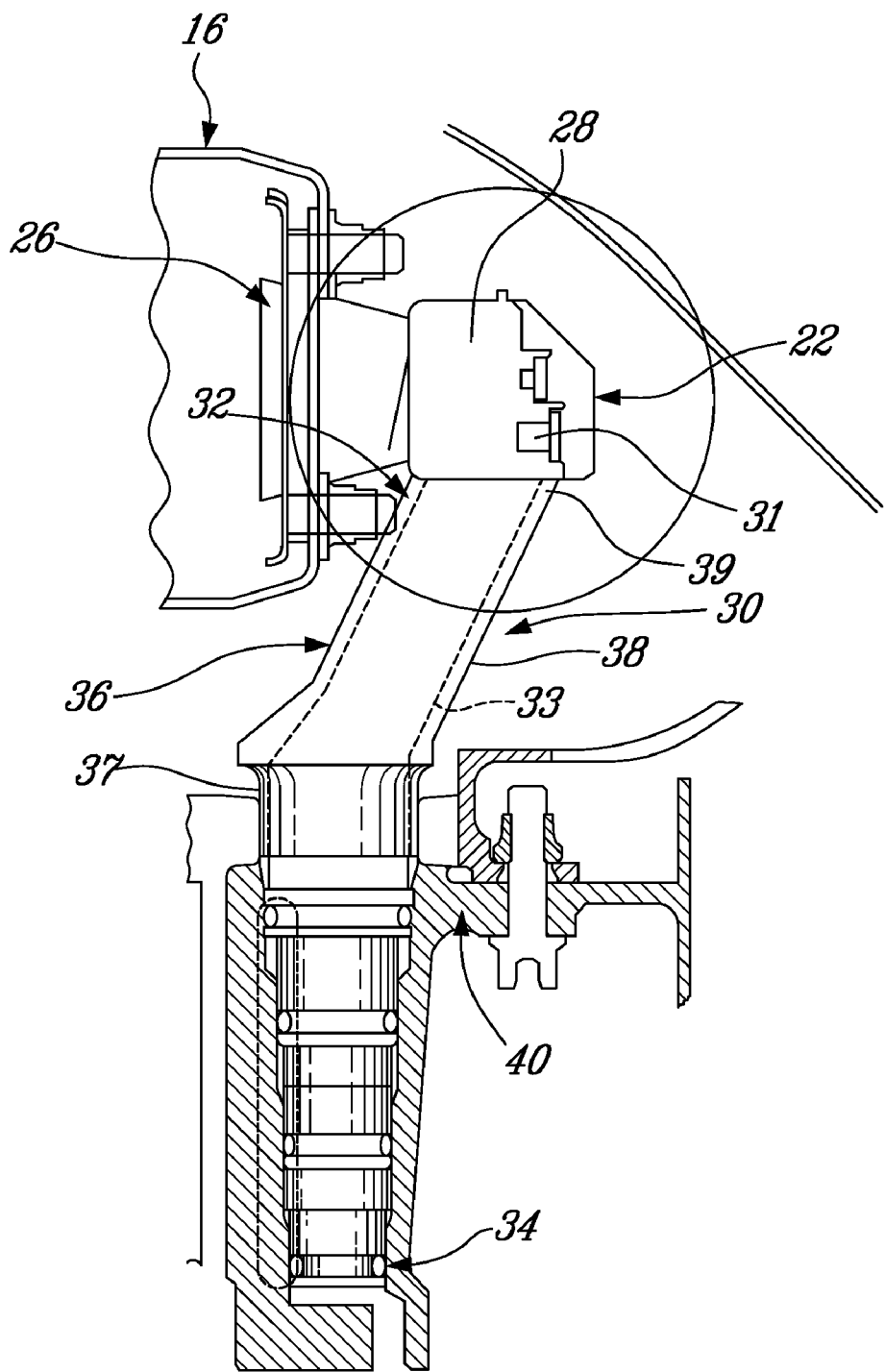
FIG. 3 is a partially sectioned side view of the fuel manifold and the fuel inlet of FIG. 2, joined in accordance with one aspect of the present invention.

Referring to FIG. 3, the fuel manifold 22 includes the fuel manifold ring 28, defining a solid body within which at least one fuel conveying passage 31 is defined for fuel flow communication with the fuel nozzle assemblies 26, is enclosed within the manifold heat shield 29. The fuel conveying passage(s) 31 is fed fuel from a fuel source (not shown) via a fuel inlet assembly 30 having a distal end 32 engaged with the fuel manifold 22 and a proximal end 34 mounted within a suitable supporting casing 40, such as the gas generator casing of the gas turbine engine for example, in communication with the fuel source. The fuel inlet assembly 30 may comprise part of a mounting system used for supporting and locating the fuel manifold 22 within the engine, and as such helps to locate the manifold 22 adjacent the combustor 16 such that fuel is delivered thereto via the fuel nozzle assemblies 26.

The fuel inlet assembly 30 generally includes an inner fuel inlet tube 33, through which fuel flows, and an outer fuel inlet heat shield 36 which surrounds the fuel inlet tube 33 along at least a portion of its length, preferably along the entire portion of its length that is exposed and extends between the casing 40 and the fuel manifold 22. The fuel inlet heat shield 36 thus helps protect the fuel inlet tube 33 of the fuel inlet assembly 30 against heat damage. Preferably, an air gap is defined between the fuel inlet tube 33 and the fuel inlet heat shield 36, which further acts as insulation to keep the fuel flowing through the fuel inlet tube 33 cooler. The fuel inlet heat shield 36 is configured, in at least one embodiment, to be able to load bearing, and as such it is used to at least partially support the internal fuel manifold 22. Although various overall shapes for the heat shield 36 are possible, the heat shield 36 is preferably generally tubular in shape, having a tubular central body portion 38 extending between a proximal end 37 and a distal end 39 thereof. The proximal end 37 is suitable mounted to and supported by the casing 40. The distal end 39 of the heat shield, as well as the distal end of the fuel inlet tube 33, are fastened to the fuel manifold 22 as will be described further below. The fuel inlet tube 33 may have a design of the type described in applicant's pending U.S. patent application Ser. No. 10/764,578, published Jul. 28, 2005, the contents of which is incorporated herein by reference.

Figure 4:
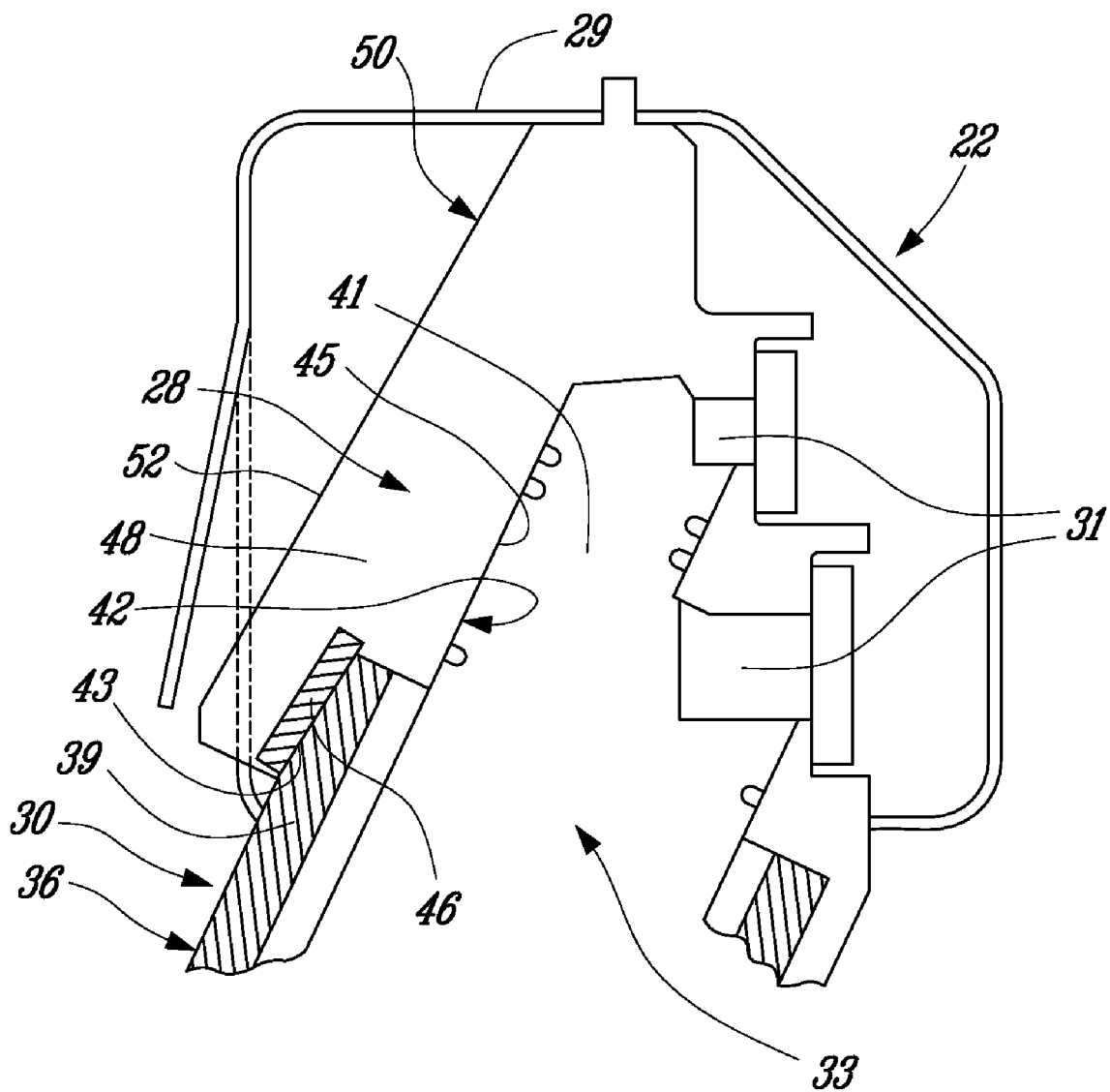
FIG. 4 is an enlarged partially sectioned view of the joint between the fuel manifold and the fuel inlet, taken from region 4 of FIG. 3.
Figure 5:
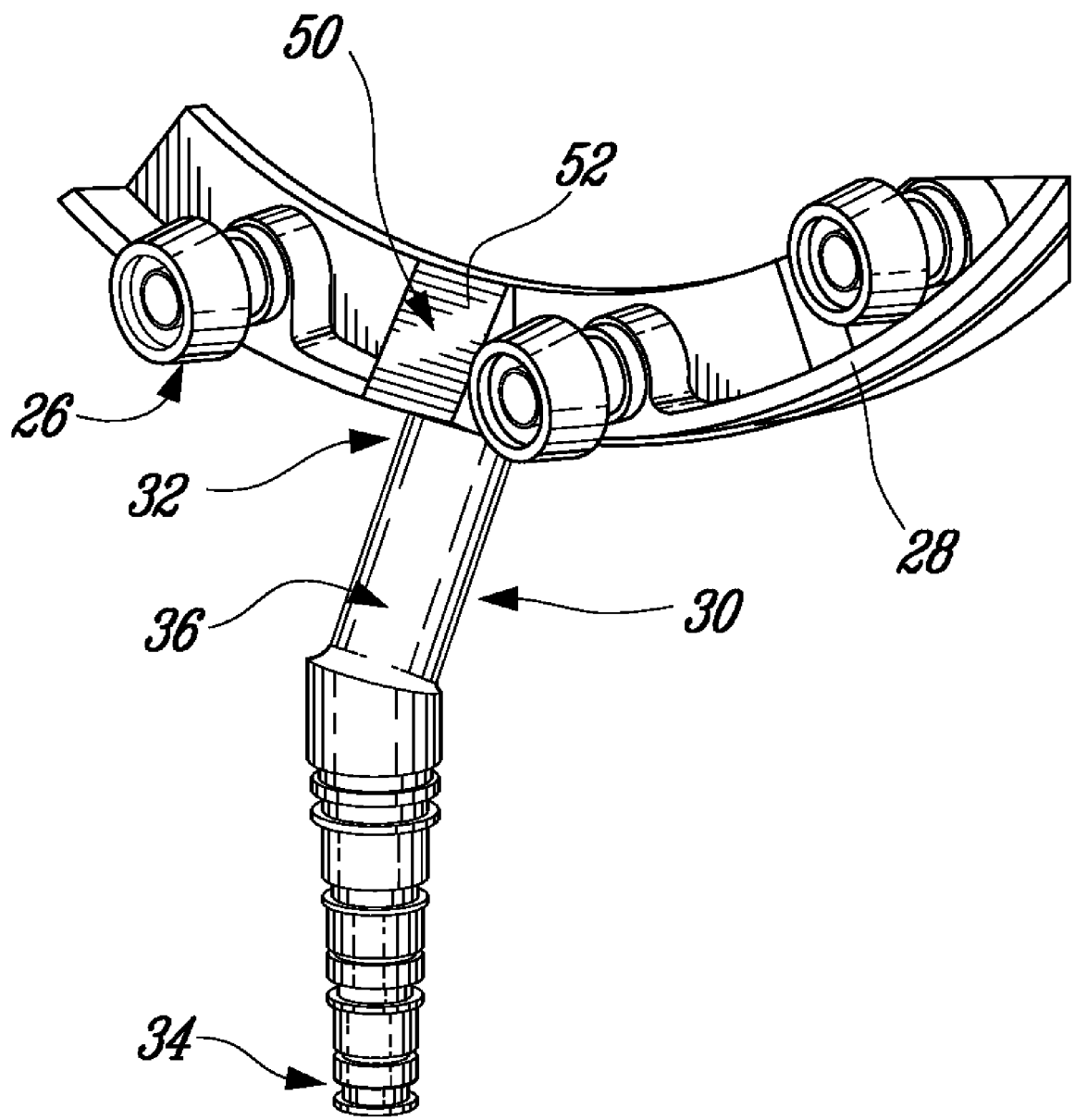
FIG. 5 is a perspective view of a portion of the fuel manifold and fuel inlet of FIG. 3, shown with the fuel manifold heat shield removed.

Referring now to FIGS. 4 and 5, the connection between the fuel manifold 22 and the distal end 32 of the fuel inlet 30 is shown in greater detail. The distal end 32 of the fuel inlet 30 in fact comprises the distal end 39 of the heat shield 36 as well as the distal end 41 of the fuel inlet tube 33, both of which are received within a stepped opening 42 defined within the solid body of the fuel manifold ring 28 at an inlet region 50 thereof. The stepped opening 42 includes an outer portion 43 which is sized to receive the distal end 39 of the fuel inlet heat shield 36 therein, and an inner portion 45 sized to receive the distal end 41 of the fuel inlet tube 33 therein a given insertion depth or distance. At least the lateral fit between the heat shield 36 and the fuel inlet tube 33 and the mating openings is preferably a snug or tight fit engagement. The distal end 39 of the fuel inlet heat shield 36 and the distal end 41 of the fuel inlet tube 33 are preferably sealingly fastened to the fuel manifold ring 28, such as by welding, brazing or the like.

The fuel inlet 30 is fastened to the fuel manifold 22 at the inlet region 50 (see FIG. 5 for example) of the fuel manifold ring 28, which is located at a predetermined point about the circumference thereof. In the depicted embodiment, the inlet region 50 is located at a bottom-most point on the ring 28. The inlet region 50 is reinforced relative to a remainder of the circumference of the fuel manifold ring 28, such as to better strengthen this region in which the fuel inlet 30 is fastened and permit improved fastening using joints such as welds, brazes, etc. in this region between the fuel manifold 22 and the fuel inlet 30. Further, the reinforcement allows improved repair of the inlet region should this become necessary, as the added material provided in the fuel inlet region 50 which provided the reinforcement also allows extra material removal which might become necessary during removal of the heat shield 36 and refurbishment/repair of the brazed joints between the fuel manifold 22 and the fuel inlet 30.

Particularly, in the depicted embodiment, the inlet region 50 has a thickness, at least in an axial direction, that is greater than that of a remainder of the circumference of the manifold ring 28. Thus, the inlet region 50 forms a discontinuous and local increase in the cross-sectional thickness relative to this remainder of the manifold ring 28. The axis thickness of the inlet region 50 is at least greater than a diameter of the distal end 39 of the fuel inlet heat shield 36, as this distal end 39 is received therein within the outer portion 43 of the opening 42 therein. Further, the thickness of at least an outer wall 48 of the enlarged inlet region 50 is sufficiently big enough to permit removal of a portion thereof (indicated at 46 in FIG. 4) should the brazed joint fastening the heat shield 36 to the inlet region 50 of the fuel manifold ring 28 need to be re-applied.

The outer wall portion 48 of the enlarged reinforced inlet region 50 of the fuel manifold ring 28 preferably has a substantially constant thickness along a majority of the insertion distance of the inlet tube 33 within the opening 42 defined in the inlet region 50. Or, in other words, the entire outer wall portion 48 has a substantially constant thickness along a length thereof corresponding to the distance that the fuel inlet tube 33 is inserted within the reinforced inlet region 50 of the fuel manifold ring 28, except for the enlarged outer portion 43 of the opening 42 which receives the heat shield 36 (which has an inner diameter greater than an outer diameter of the fuel inlet tube 33) therein. As such, the outer surface 52 of the outer wall portion 48 is substantially parallel to the fuel inlet tube 33. In one embodiment, as depicted, the fuel inlet tube 33 (and therefore the entire fuel inlet 30) is angled relative to a plane within which lies the fuel manifold ring 28 and which is perpendicular to the main longitudinal axis 11 of the engine (which is also coincident with a center of the annular fuel manifold ring 28). Accordingly, the outer surface 52 of the outer wall portion 48 is similarly angled relative to said plane. This results, as best seen in FIG. 5, in the reinforced inlet region 50 having a triangularly shaped profile protruding outward, or more specifically downward in a direction towards the fuel inlet 30 and forward in a direction towards the fuel nozzles 26, from adjacent regions of the fuel manifold ring 28 on either side thereof. Thus, the angled outer wall surface 52 of the outer wall portion 48 is sloped radially outward.

The above description is meant to be exemplary only, and one skilled in the art will recognize that changes may be made to the embodiments described without department from the scope of the invention disclosed. For example, the particular configuration of manifold support system and joint between the fuel inlet and the fuel manifold disclosed are preferred, but of course not necessary to achieve the function taught herein. Although described with respect to airborne gas turbines, the invention may be applied to any suitable engine in a suitable application. Still other modifications which fall within the scope of the present invention will be apparent to those skilled in the art, in light of a review of this disclosure, and such modifications are intended to fall within the appended claims.

The invention claimed is:

1. An internal fuel manifold assembly for a gas turbine engine comprising:
a fuel manifold ring having at least one fuel conveying passage therein in fluid flow communication with a plurality of fuel injection nozzles adapted for spraying fuel into a combustor of the gas turbine engine, the fuel manifold ring having an inlet region that is reinforced relative to a remainder of a circumference of the fuel manifold ring; and a fuel inlet assembly having a fuel inlet tube providing fluid flow communication with said at least one fuel conveying passage within the fuel manifold ring, the fuel inlet assembly being joined to the fuel manifold ring at said reinforced inlet region thereof, wherein said reinforced inlet region of the fuel manifold ring has a thickness in an axial direction greater than that of said remainder of the fuel manifold ring.

2. The internal fuel manifold assembly as defined in claim 1, wherein said reinforced inlet region of the fuel manifold ring is a discontinuous increase in cross-sectional thickness relative to said remainder of the circumference of the fuel manifold ring.

3. The internal fuel manifold assembly as defined in claim 1, wherein said fuel inlet assembly includes a tubular heat shield disposed outwardly from the fuel inlet tube and extending along at least a portion of a length thereof, the heat shield having an outer end fastened to the fuel manifold ring at said inlet region thereof, said reinforced inlet region having a maximum axial thickness at least greater than a diameter of the outer end of the heat shield.

4. The internal fuel manifold assembly as defined in claim 1, wherein said reinforced inlet region of the fuel manifold ring has an opening therein within which an outer end of the fuel inlet tube is sealingly received a given insertion distance, an outer wall of said reinforced inlet region surrounding said outer end of the fuel inlet tube having a substantially constant thickness along a majority of said insertion distance.

5. The internal fuel manifold assembly as defined in claim 1, wherein said fuel manifold ring defines a plane substantially perpendicular to a longitudinal main engine axis which is coincident with a center of the fuel manifold ring, said fuel inlet tube being disposed at an angle relative to said plane.

6. The internal fuel manifold assembly as defined in claim 5, wherein said fuel reinforced inlet region of the fuel manifold ring has an outer wall surface which is substantially parallel to said angle.

7. The internal fuel manifold assembly as defined in claim 1, wherein said reinforced inlet region of the fuel manifold ring has an outer wall surrounding an outer end of the fuel inlet assembly, the outer wall having a thickness sufficient to permit material removal prior to refinishing a joint between the fuel inlet assembly and the fuel manifold ring.

8. The internal fuel manifold assembly as defined in claim 1, wherein said fuel inlet assembly and said fuel manifold fastened together by a brazed joint.

9. A mounting system for an internal fuel manifold of a gas turbine engine comprising a series of supports spaced apart about the fuel manifold, the series of supports including a fuel inlet assembly connected to the fuel manifold and providing fuel flow thereto, the fuel inlet assembly having a heat shield surrounding an internal fuel inlet tube defining a fuel flow passage therein, the fuel inlet assembly being joined to the fuel manifold at a inlet region thereon, said inlet region being reinforced relative to a remainder of the fuel manifold, wherein said reinforced inlet region of the fuel manifold has a thickness in an axial direction greater than that of said remainder of the fuel manifold.

10. The mounting system as defined in claim 9, wherein said inlet region defines a stepped opening therein, the stepped opening receiving outer ends of the fuel inlet tube and the heat shield concentrically therein.

11. The mounting system as defined in claim 10, wherein said outer ends of the fuel inlet tube and the heat shield are fastened to said reinforced inlet region of said fuel manifold.

12. The mounting system as defined in claim 11, wherein said outer ends are brazed to said reinforced inlet region.

13. The mounting system as defined in claim 9, wherein said reinforced inlet region of the fuel manifold ring has an outer wall surrounding an outer end of the fuel inlet assembly which is received therein, the outer end of the fuel inlet assembly and the fuel manifold being fastened together by a joint, the outer wall of the reinforced inlet region having a thickness sufficient to permit material removal prior to refinishing said joint.

14. The mounting system as defined in claim 9, wherein said fuel manifold is an annular ring, said reinforced inlet region thereof being a discontinuous increase in cross-sectional thickness relative to said remainder of the fuel manifold about a circumference thereof.

15. A method of manufacturing an internal fuel manifold for a gas turbine engine comprising:
forming an annular fuel manifold ring having at least one fuel conveying passage therein and having a nominal cross-sectional thickness in an axial direction about a majority of a circumference of the annular fuel manifold; and
forming a reinforced inlet region of the annular fuel manifold, the reinforced inlet region being adapted to receive a fuel inlet therein for providing fuel flow to the at least one fuel conveying passage, the reinforced inlet region having a locally increased cross-sectional thickness relative to said nominal cross-sectional thickness.

16. The method of manufacturing as defined in claim 15, wherein the step of forming said reinforced inlet region further comprises forming an outer wall portion thereof surrounding an opening for receiving the fuel inlet, the outer wall portion having a thickness sufficient to permit material removal prior to refinishing a joint between the fuel inlet and the fuel manifold once fastened together.

17. The method of manufacturing as defined in claim 16, further comprising making said thickness of said outer wall substantially constant along a majority of a depth of said opening within said fuel inlet is receivable.

18. The method of manufacturing as defined in claim 15, further comprising fastening said fuel inlet to said reinforced fuel inlet region by a brazed joint.

* * * * *